(12) United States Patent
Rizkin et al.

(10) Patent No.: US 6,814,470 B2
(45) Date of Patent: Nov. 9, 2004

(54) HIGHLY EFFICIENT LED LAMP

(75) Inventors: Alexander Rizkin, Redondo Beach, CA (US); Robert H. Tudhope, Rancho Palos Verdes, CA (US)

(73) Assignee: Farlight LLC, Wilmington, CA (US)

(*) Notice: Subject to any disclaimer, the term of this patent is extended or adjusted under 35 U.S.C. 154(b) by 0 days.

(21) Appl. No.: 10/316,642

(22) Filed: Dec. 11, 2002

(65) Prior Publication Data

US 2003/0137838 A1 Jul. 24, 2003

Related U.S. Application Data

(63) Continuation-in-part of application No. 10/277,230, filed on Oct. 21, 2002, which is a continuation-in-part of application No. 09/566,521, filed on May 8, 2000, now Pat. No. 6,543,911.

(51) Int. Cl.[7] .................................................. F21V 5/00
(52) U.S. Cl. ........................ 362/327; 362/240; 362/245; 362/800
(58) Field of Search ................................. 362/240, 241, 362/243, 244, 800, 327, 329, 245; 359/718

(56) References Cited

U.S. PATENT DOCUMENTS

| | | | | |
|---|---|---|---|---|
| 2,215,900 A | * | 9/1940 | Bitner | 362/309 |
| 5,775,792 A | * | 7/1998 | Wiese | 362/328 |
| 6,402,347 B1 | * | 6/2002 | Maas et al. | 362/294 |
| 6,547,423 B2 | * | 4/2003 | Marshall et al. | 362/333 |

* cited by examiner

Primary Examiner—Alan Cariaso
Assistant Examiner—Ali Alavi
(74) Attorney, Agent, or Firm—Gehrke & Associates, S.C.

(57) ABSTRACT

A highly efficient LED lamp includes an optical module and a housing. The optical module has at least one light emitting diode (LED) that emits light with a wide divergence, a non-imaging optical (NIO) element and a transparent window. The NIO element includes a refractive member located around a LED optical axis and a total internal reflection member located around the refractive member. The refractive member and the total internal reflection member are integrated in a single transparent element having a mutual focal point, wherein the NIO element collects a significant amount of light emitted by the LED with wide divergence located at the focal point, to compress the collected light with high efficiency into a beam with a generally different angular spread in a horizontal plane and a vertical plane and to direct the compressed light outside of the lamp.

16 Claims, 4 Drawing Sheets

HIGHLY EFFICIENT LED LAMP

CROSS-REFERENCE TO RELATED APPLICATIONS

This application is a continuation-in-part of U.S. application Ser. No. 10/277,230 filed Oct. 21, 2002 which is a continuation-in-part application of U.S. application Ser. No. 09/566,521 filed May 8, 2000, now U.S. Pat. No. 6,543,911 (allowed Sep. 24, 2002).

BACKGROUND OF THE INVENTION

1. Field of the Invention

The present invention relates generally to signal lights and illumination. In particular, the present invention relates to directional light sources (lamps) such as a parabolic aluminum reflector (PAR) type, metallized reflector (MR) type, reflector (R) type and the like.

2. Discussion of the Related Art

Lighting device efficiency has always been a major factor in light source evaluation. Efficiency is measured by the portion of all generated light that is useful for a given application (e.g., to illuminate a given area with a given illuminance). Most conventional light sources (incandescent, halogen, fluorescent, high discharge, high pressure, etc.) by their nature are almost omnidirectional sources in that they emit light in all directions.

For applications that require light distribution in limited angles or area, the conventional light sources are typically used in combination with reflectors that collect and direct the light generated by the source.

It is well known that these systems are not very efficient. For example, medium approach lighting systems for airplane landings require an average intensity of 10,000 candelas in an area 20° in horizontal by 11° in vertical that results in a total luminous flux of approximately 300 lm. For this application, PAR-38 100 watt lamps are typically used that emit approximately 1,500 lm. Unfortunately, efficiency of this type of lamp in this type of application is approximately 20%.

A new generation of lighting devices is based on solid state technology. In addition to other benefits, light emitting diodes (LEDs) have higher efficiency in that they produce more light per watt and they have an extremely long life. Recent advances have taken place in the area of directional LED lamp construction.

One of the basic categories of LED lamp construction is the implementation of multiple LEDs in a cluster to combine luminous flux from multiple LEDs using primary optics integrated in the LED for directionality. LED manufacturers offer a wide choice of primary optics including from 120° to 5° directionality.

Unfortunately, higher directionality correlates to higher losses in the primary optics. For example, LEDs having the same chip in a 5 mm diameter green Nichia LED™ (NSPG-5 series) has a total luminous flux of 1.46 lm with a 45° lens, 1.2 lm with a 30° lens, and only 0.7 lm with a 15° lens. Consequently, using primary LED optics results in an inefficient LED lamp design.

The other basic category of construction of LED lamp design is based on the use of an additional optical element (a "secondary optic") to concentrate and direct the light (e.g., implementation of a refractive lens, using a reflector as a secondary optic, etc.).

Unfortunately, none of the current designs based on the use of LEDs in combination with conventional optics (refractive or reflective) provides high efficiency performance because almost all conventional optic designs are based on the "point source" concept with the assumption that the light source has a negligible physical size which is work for low power LEDs typically having a lighting body tens to hundreds of microns.

With the tendency of the LED technology to reach high power, the physical size of the LED chips are becoming much larger. For example, Lumelid's Luxeon Star™ 1 watt LED has a chip that is 0.5×0.5 mm and Luxeon Star™ 5 watt is 2.0×2.0 mm². Increasing light source size with the use of conventional optics creates a sufficient aberration, resulting in large losses and low efficiency.

What is needed, therefore, to overcome these limitations found in conventional systems is the application of solid-state technology (e.g., light emitting diodes) using nonimaging optics (NIO) as a secondary optic.

SUMMARY OF THE INVENTION

The present invention includes a highly efficient LED lamp based on the use of a high power LED as a light source in combination with a non-imaging optical element as a secondary optic. Multiple LEDs can also be used in combination with the non-imaging optical elements to provide specific spatial light distribution. The lamp can also include a light shaping element and an adapter/converter for conventional lamp replacement.

In particular, the present invention provides a highly efficient LED lamp including an optical module and a housing. The optical module includes at least one light emitting diode (LED) that emits light with a wide divergence and a non-imaging optical element (NIO). The NIO includes a refractive member located around a LED optical axis and a total internal reflection member located around the refractive member, wherein the refractive member and the total internal reflection member are integrated in a single transparent element having a mutual focal point, wherein the NIO element collects a significant amount of light emitted by the LED with wide divergence located at the focal point, to compress the collected light with high efficiency into a beam with a generally different angular spread in a horizontal plane and a vertical plane and to direct the compressed light outside of the lamp. A transparent window transmits light outside of the lamp. A housing includes an electrical connector connected to an outside power source, and the connector is electrically connected to the LED.

According to one aspect of the invention, an optical module includes at least one light emitting diode (LED) that emits light with a wide divergence. A non-imaging optical element (NIO) includes a refractive member located around a LED optical axis and a total internal reflection member located around the refractive member, wherein the refractive member and the total internal reflection member are integrated in a single transparent element having a mutual focal point, wherein the NIO element collects a significant amount of light emitted by the LED with wide divergence located at the focal point, to compress the collected light with high efficiency into a beam with a symmetrical angular spread in a horizontal plane and a vertical plane. A transparent window transmits shaped light outside of the lamp, wherein the NIO element directs the compressed light towards the transparent window. A light shaping element is located between the non-imaging optical element and the transparent window.

According to yet another aspect of the invention, a highly efficient LED lamp includes an optical window having at least one light emitting diode (LED) that emits light with a wide divergence. A non-imaging optical element (NIO) includes a refractive member located around a LED optical axis and a total internal reflection member located around the refractive member, wherein the refractive member and the total internal reflection member are integrated in a single transparent element having a mutual focal point, wherein the NIO element collects a significant amount of light emitted by the LED with wide divergence located at the focal point, to compress the collected light with high efficiency into a beam with a generally different angular spread in a horizontal plane and a vertical plane, and to direct the compressed light outside of the lamp. A transparent window transmits the light outside of the lamp. A housing has an electrical connector connected to an outside power source. An electronic adapter/converter is mounted to the housing, and the adapter/converter has an electrical input and an electrical output, wherein the electrical input is connected to the electrical connector in the housing and the electrical output is connected to the LED.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

DETAILED DESCRIPTION OF THE PREFERRED EMBODIMENTS

Figure 1:
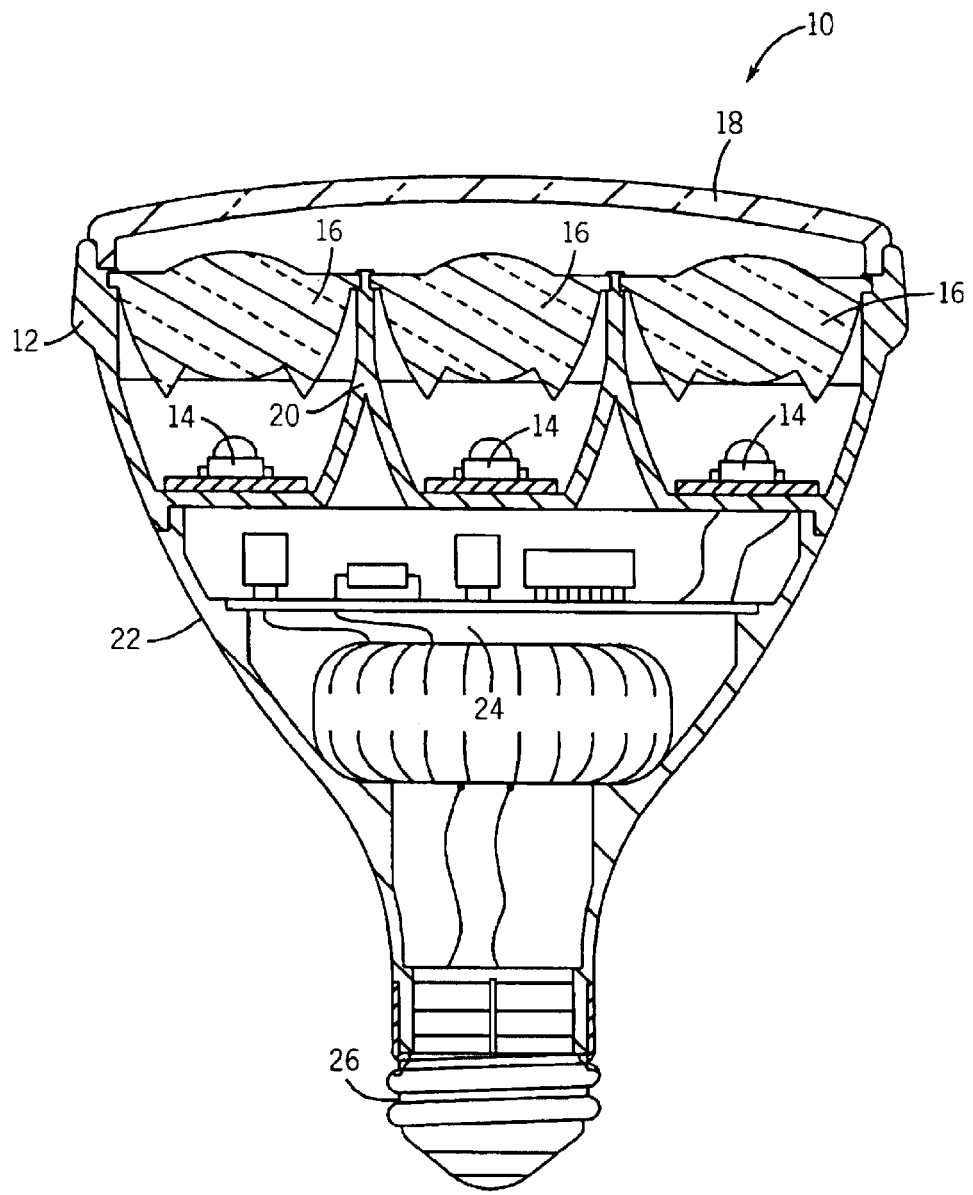
FIG. 1 is a cross-sectional view of an LED lamp according to the present invention.

Referring now to FIG. 1, a highly efficient lamp 10 includes an optical module 12 having light emitting diodes (LEDs) 14 that emit light with a wide divergence and non-imaging optical elements 16 to compress the emitted light into a desired beam. Optical module 12 further includes a transparent window 18 to transmit compressed light outside lamp 10.

A structure 20 is a heat sink for LEDs 14 and a holder for non-imaging optical elements 16. Optical module 12 is mounted on a housing 22 that contains an adapter/converter 24 and a connector 26. An outside power source (not shown) is connected to lamp 10 through connector 26, which is electrically connected to the adapter/converter input.

Figure 2A:
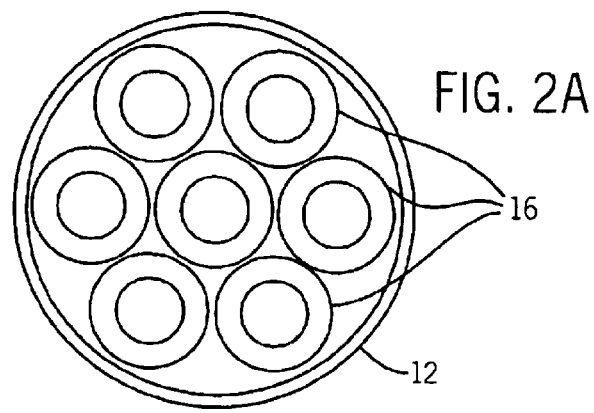
FIG. 2A is a top view of an optical module including multiple non-imaging optical elements having a symmetrical angular spread in the horizontal and vertical planes according to the present invention.
Figure 2B:
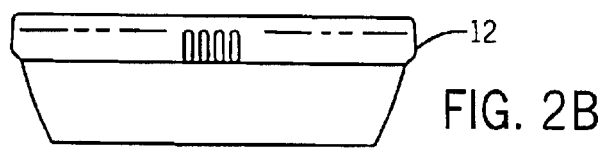
FIG. 2B is a side view of the optical module according to the present invention.

Adapter/converter 24 converts input voltage to a value required for proper LED operation (e.g., 120 volt AC to 4 volt DC or 24 volt DC to 4 volt DC). Adapter/converter 24 includes conventional electronic components such as a transformer, resistor, capacitor, regulator, etc. Housing 22 and connector 26 can be made with the dimensions and shape identical to the commonly used conventional bulb. For example, a PAR 38 lamp by determination has a standard diameter of $3\frac{8}{16}$" for all manufacturers, a parabolic reflector and an Edison base. The space inside this lamp can easily accommodate an optical module consisting of 7 Lumiled Luxeon Star™ LED (1.3 watts each) with 7 symmetrical nonimaging optical elements not exceeding $1\frac{3}{8}$" in diameter, and 10 watts 120 VAC to 4VDC adapter (FIGS. 1, 2A and 2B).

Calculations show that a LED lamp with this design will provide a minimum average intensity of 10,000 candelas in a spot with full width half maximum (FWHM) of approximately 7° which is identical to a conventional General Electric™ 100 watt PAR 38 spotlight or a Westinghouse™ 150 watt PAR 38 spotlight commonly used for medium intensity approach lighting systems (MALS) in airports to provide guidance to plane landings. This example illustrates that LED lamps according to the present invention have 10 to 15 times less power consumption as compared to a conventional lamp.

Figure 3:
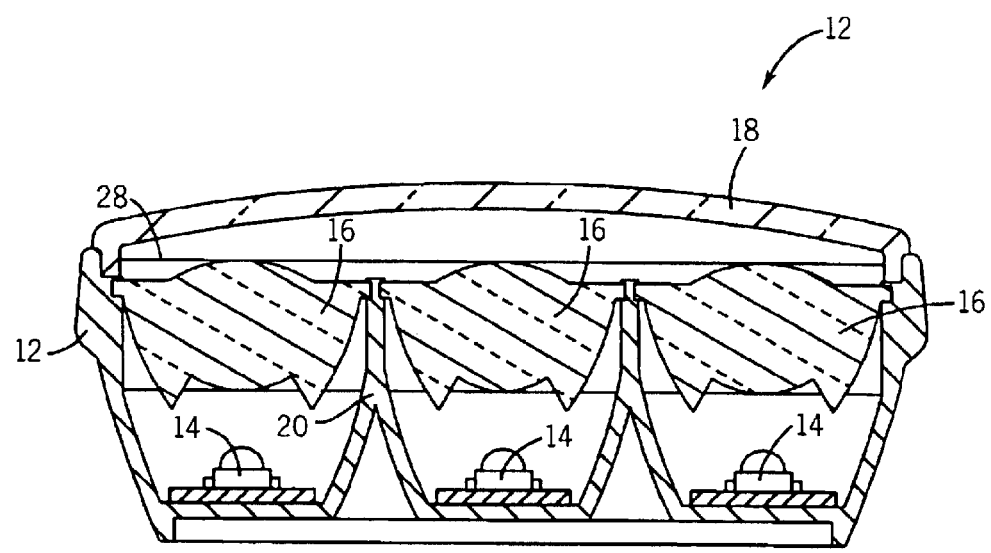
FIG. 3 is a cross-sectional view of the optical module including multiple non-imaging optical elements and a light shaping element according to the present invention.

Referring now to FIG. 3, optical module 12 includes multiple LEDs 14, each in combination with non-imaging optical element 16. LEDs 14 emit light with wide divergence (120°–160°). Non-imaging optical element 16 collects almost all of the light emitted by LED 14 located in the focal point of non-imaging optical element 16, and compresses the collected light with high efficiency into a beam with symmetrical angular intensity distribution in both the horizontal and the vertical planes.

A light shaping element 28 forms the outgoing light into a beam with a required pattern. In the preferred embodiment of the present invention, a holographic diffuser is used as a light shaping element 28.

For example, consider a medium approach lighting system specification that requires a light pattern of 20° in the horizontal and 11° in the vertical. Assume that non-imaging optical element 16 is designed to compress the light emitted from LED 14 with a wide divergence of 120° into a symmetrical beam with a divergence of 5° in both the horizontal and vertical planes. Using the formula:

$$\theta = \sqrt{\theta_B^2 + \theta_d^2}$$

where $\theta$ is the outgoing beam divergence, $\theta_B$ is the compressed beam divergence, and $\theta_d$ is the holographic diffuser divergence in a given plane, it can be calculated that using a holographic diffuser with a horizontal divergence equal to 19° and vertical divergence equal to 10°, the outgoing beam will perfectly match the above specification. Transparent window 18 transmits the outgoing beam outside of lamp 10.

Figure 4:
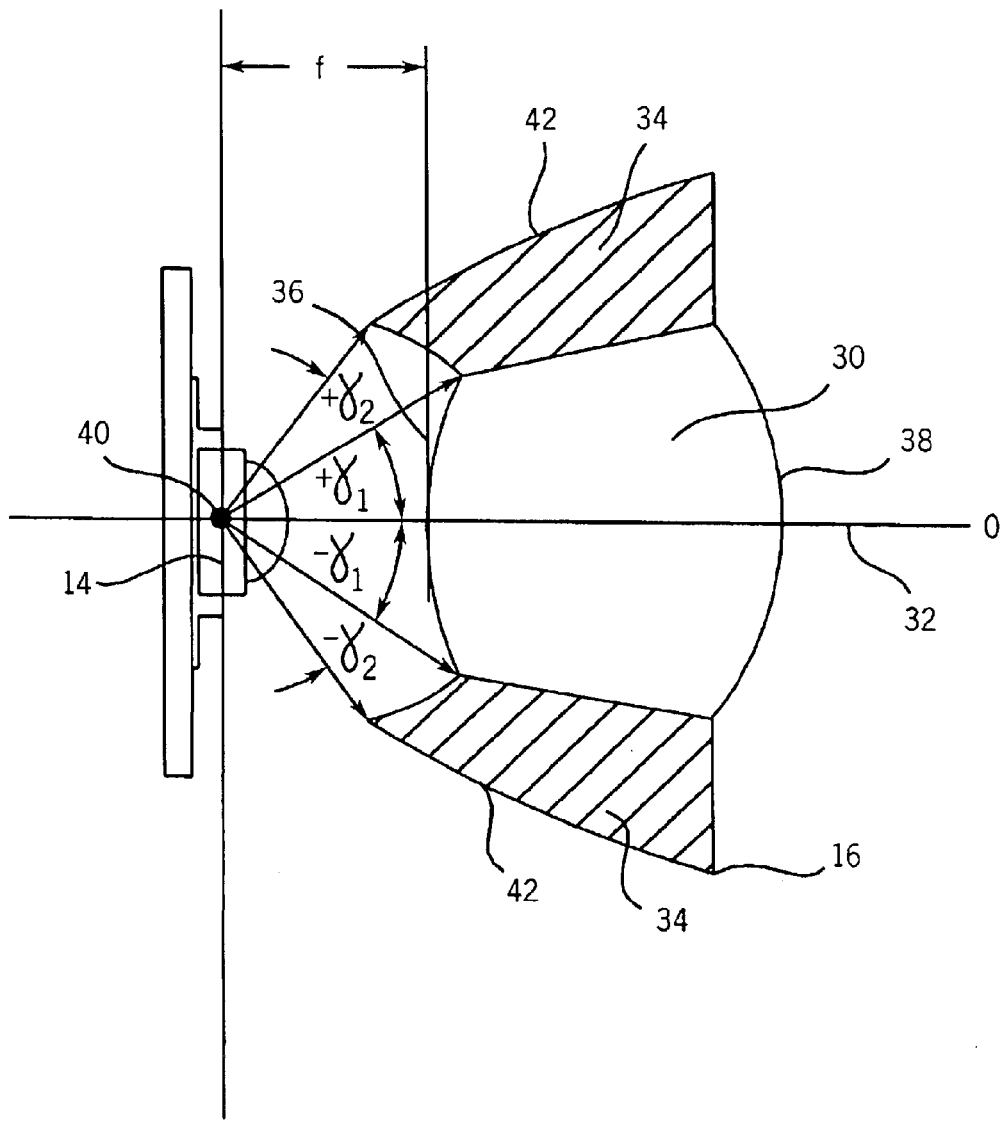
FIG. 4 is a cross-sectional view of a LED and non-imaging optic element according to the present invention.

Referring now to FIG. 4, non-imaging optical element 16 includes a combination of two functional parts: a refractive member 30 located symmetrically around an optical axis 32, and a total internal reflection (TIR) member 34 located symmetrically around refractive member 30. Both refractive member 30 and TIR member 34 are integrated in a single transparent seamless element having an input end 36 receiving light from LED 14 and an output end 38 directing light outside luminaire 10.

In the preferred embodiment of the present invention, refractive member 30 and TIR member 34 have a single mutual focal point 40 where LED's 14 lighting body (chip) is located. Focal point 40 is located on optical axis 32 at a focal distance $f$ from the intersection of optical axis 32 with refractive member 30 input end 36.

LED 14 emits light with wide divergence (preferably up to 160°) that makes it difficult to collect emitted light with high efficiency by way of conventional optics. In the preferred embodiment of the present invention, non-imaging optical element 16 collects light via two mechanisms.

Light rays with low and medium divergence ($\pm\gamma_1$) are collected by refractive member 30 that is operated in a first approximation similar to an aspheric lens, generally with different optical power on a vertical axis and a horizontal axis.

In the preferred embodiment, light rays with high divergence (angles $\pm\gamma_2$) are collected by TIR member 34. An outside surface 42 of TIR member 34 is calculated in such a manner that provides total internal reflection for all rays in angle $\pm\gamma_2$, and reflected rays are directed through output end 38 with a precalculated divergence, not exceeding a maximum angle as given by the specification.

Figure 5A:
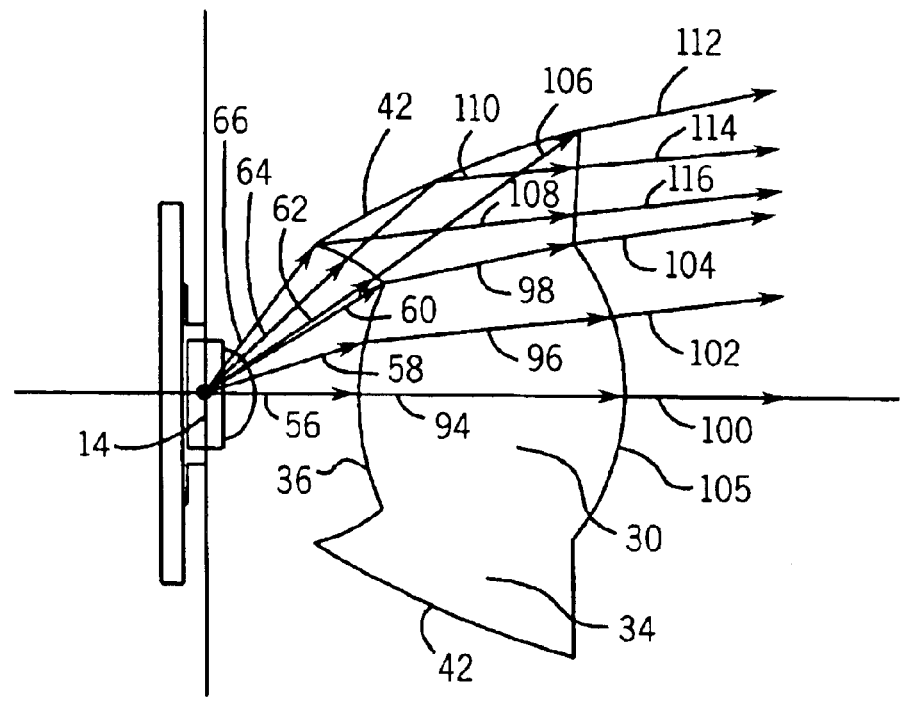
FIG. 5A is cross-sectional view of a LED-non-imaging optic element in a horizontal plane according to the present invention.
Figure 5B:
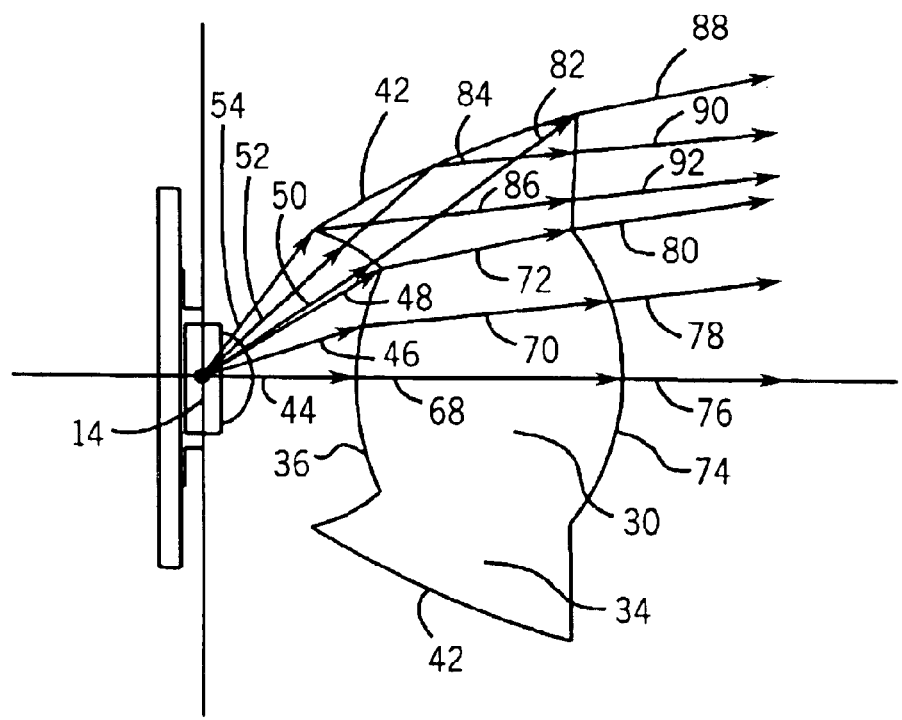
FIG. 5B is a cross-sectional view of a LED-non-imaging optic element in a vertical plane according to the present invention.

FIGS. 5A and 5B illustrate the LED-non-imaging optical element interaction in the horizontal plane (top view) and vertical plane (side view) respectively. LED 14 with an axial-symmetric primary optic emits a symmetrical cone of light rays with a wide but limited angle. Therefore, the divergence of the emitted light is equal in both the horizontal and vertical planes so that a series of rays 44, 46, 48, 50, 52 and 54 (FIG. 5B) in the vertical plane are identical to a series of rays 56, 58, 60, 62, 64 and 66 (FIG. 5A) in the horizontal plane. Accordingly, the calculated profile of input end 36 of non-imaging optical element 16 that collects all of the light emitted from LED 14 is also axis-symmetrical and has no difference in profile.

Incident rays 44, 46 and 48 (FIG. 5B) pass through refractive member 30 as a series of rays 68, 70 and 72. As a result of refraction on a calculated profile 74, rays 68, 70 and 72 are directed outside as a series of rays 76, 78 and 80, respectively, with maximum divergence not exceeding a specified angle $\beta$ in the vertical plane.

Incident rays 50, 52 and 54 pass through TIR member 34 and are reflected from TIR outside surface 42 as a series of rays 82, 84 and 86, respectively. The profile of TIR outside surface 42 is calculated to provide a maximum divergence of a series of rays 88, 90, 92 not exceeding a specified angle $\beta$ in the vertical plane. Different methods and software are implemented in the TIR property calculation. The most common procedure involves multiple ray tracing and recurrent calculation based on a point-to-point profiling.

The non-imaging optical element 16 in the horizontal plane (FIG. 5A) is performed in a similar fashion to the vertical plane (FIG. 5B). Rays 56, 58 and 60 are collected by refractive member 30 and pass through as a series of rays 94, 96 and 98, respectively, and are directed through the outside end as a series of rays 100, 102 and 104, respectively. A profile of an output end 105 in the horizontal plane is different from profile 74 of the output end in the vertical plane (FIG. 5B) and calculated to provide a maximum divergence angle in the horizontal plane not exceeding a specified angle $\alpha$.

For example, if angle $\alpha$ in the horizontal plane is bigger than angle $\beta$ in the vertical plane, the gradient of curvature in general for profile 74 in the vertical plane will be higher than the gradient of curvature for profile 105 in the horizontal plane. Furthermore, both profiles 74 and 105 are dependent on the LED spatial intensity distribution, which is included as a function in the profile calculation.

In the preferred embodiment of the present invention and in a similar manner as described above, incident rays 62, 64 and 66 are reflected from TIR outside surface 42 of TIR member 34 as a series of rays 106, 108 and 110, respectively, and directed outside through the output end as a series of rays 112, 114 and 116, respectively. The profile of TIR outside surface 42 in the horizontal plane (FIG. 5A) is different from TIR outside surface 42 in the vertical plane (FIG. 5B), and is calculated to provide a maximum divergence angle in the horizontal plane not exceeding a specified angle $\alpha$.

The scope of the application is not to be limited by the description of the preferred embodiments described above, but is to be limited solely by the scope of the claims that follow. For example, multiple LEDs can be replaced by an array of laser diodes in combination with light shaping elements (e.g., holographic diffusers, etc.) or multiple LEDs can be substituted by plasma light sources with primary optics (e.g., a fusion light). Additionally, a single light source in combination with a fiber optic splitter and an individual light transformer to concentrate and shape outgoing light can also be implemented without departing from the scope of the preferred embodiment of the present invention.

What is claimed is:

1. A highly efficient LED lamp comprising:
   at least one light emitting diode (LED) that emits light with a wide divergence;
   a transparent window to transmit light outside the lamp; and
   a non-imaging optical (NIO) element that collects light emitted by the LED with high efficiency, compresses the collected light and directs the compressed light through the transparent window with a different angular divergence in a horizontal plane and a vertical plane, and a precalculated intensity distribution across the divergent beam, wherein the NIO further includes,
      a refractive member located around a LED optical axis having a first end that collects light from the LED and a second end opposite the first end to transmit light;
      a total internal reflection member located around the refractive member, wherein the TIR member has a first end to collect light and a second end opposite the first end to transmit light, and a wall formed therebetween wherein an outside surface of the wall is curved to reflect light through the second end of the refractive member with a precalculated divergence that does not exceed a maximum angle;
      wherein the refractive member and the TIR member are integrated into a single transparent element having a mutual focal point, and wherein light is emitted with the precalculated angular divergence and intensity distribution across the divergent beam based on the curved outside surface wall of the TIR member and a curved surface of the refractive member, wherein the curved surfaces provide different angular divergence in orthogonal axes perpendicular to the LED optical axis and the curvature of the curved surfaces is a function of an incident angle, an intensity of the light source at the incident angle, a reflected angle, and a required intensity of reflected light at the reflected angle; and a housing connected to the LED through an electrical connector providing power to the LED.

2. The LED lamp according to claim 1, wherein the lamp further comprises a plurality of LEDs.

3. The LED lamp according to claim 2, wherein each of the plurality of LEDs further includes a corresponding NIO element.

4. The LED lamp according to claim 3, wherein each of the NIO elements has an identical curvature of corresponding surfaces to provide identical angular divergence in the emitted pattern based on superposition.

5. The LED lamp according to claim 1, further comprising a plurality of LEDs wherein each of the LEDs further includes a corresponding NIO element, wherein one of the NIO elements has a dissimilar angular divergence from the other NIO elements and superposition of the corresponding light beams provides the precalculated intensity distribution in the pattern emitted by the lamp.

6. An optical module comprising:
at least one light emitting diode (LED) that emits light with a wide divergence;
a transparent window to transmit light outside the lamp; and
a non-imaging optical (NIO) element that collects light emitted by the LED with high efficiency, compresses the collected light and directs the compressed light through the transparent window with a different angular divergence in a horizontal plane and a vertical plane, and a precalculated intensity distribution across the divergent beam, wherein the NIO further includes,
a refractive member located around a LED optical axis having a first end that collects tight from the LED and a second end opposite the first end to transmit light;
a total internal reflection member located around the refractive member, wherein the TIR member has a first end to collect light and a second end opposite the first end to transmit light, and a wall formed therebetween wherein an outside surface of the wall is curved to reflect light through the second end of the refractive member with a precalculated divergence that does not exceed a maximum angle; and
wherein the refractive member and the TIR member are integrated into a single transparent element having a mutual focal point, and wherein light is emitted with the precalculated angular divergence and intensity distribution across the divergent beam based on the curved outside surface wall of the TIR member and a curved surface of the refractive member, wherein the curved surfaces provide different angular divergence in orthogonal axes perpendicular to the LED optical axis and the curvature of the curved surfaces is a function of an incident angle, an intensity of the light source at the incident angle, a reflected angle, and a required intensity of reflected light at the reflected angle.

7. The optical module according to claim 6, wherein the optical module further comprises a plurality of LEDs.

8. The optical module according to claim 7, wherein each of the plurality of LEDs further includes a corresponding NIO element.

9. The optical module according to claim 8, wherein each of the NIO elements has an identical curvature of corresponding surfaces to provide identical angular divergence in the emitted pattern based on superposition.

10. The optical module according to claim 6, further comprising a plurality of LEDs wherein each of the LEDs further includes a corresponding NIO element, wherein one of the NIO elements has a dissimilar angular divergence from the other NIO elements and superposition of the corresponding light beams provides the precalculated intensity distribution in the pattern emitted by the lamp.

11. The optical module according to claim 9, further comprising a light shaping element between the NIO element and the transparent window, perpendicular to the LED optical axis, wherein the light shaping element diffuses light with a divergence higher than the NIO element independently on the orthogonal axis perpendicular to the LED optical axis, and divergence of the light emitted by the optical module on each axes is equal to the square root of the sum of the NIO element divergence square and the light shaping element divergence square on the corresponding axes.

12. The optical module according to claim 11, wherein the light shaping element is a holographic diffuser.

13. An optical module comprising:
a plurality of light emitting diodes (LEDs) that emit light with a wide divergence;
a transparent window to transmit light outside the lamp; and
a plurality of non-imaging optical (NIO) elements that collect light emitted by the LEDs with high efficiency, compress the collected light and direct the compressed light through the transparent window with a different angular divergence in a horizontal plane and a vertical plane, and a precalculated intensity distribution across the divergent beam, wherein the NIO elements further include,
a refractive member located around a LED optical axis having a first end that collects light from the LEDs and a second end opposite the first end to transmit light;
a total internal reflection member located around the refractive member, wherein the TIR member has a first end to collect light and a second end opposite the first end to transmit light, and a wall formed therebetween wherein an outside surface of the wall is curved to reflect light through the second end of the refractive member with a precalculated divergence that does not exceed a maximum angle; and
wherein the refractive member and the TIR member are integrated into a single transparent element having a mutual focal point, each of the plurality of LEDs further includes a corresponding NIO element, and each of the NIO elements has an identical curvature of corresponding surfaces to provide identical angular divergence in the emitted pattern based on superposition.

14. The optical module according to claim 13, wherein light is emitted with the precalculated angular divergence and intensity distribution across a divergent beam based on the curved outside surface wall of the TIR member and a curved surface of the refractive member, wherein the curved surfaces provide different angular divergence in orthogonal axes perpendicular to the LED optical axis and the curvature of the curved surfaces is a function of an incident angle, an intensity of the light source at the incident angle, a reflected angle, and a required intensity of reflected light at the reflected angle.

15. The optical module according to claim 13, further comprising a light shaping element between the NIO elements and the transparent window, perpendicular to the LED optical axis, wherein the light shaping element diffuses light with a divergence higher than the NIO elements independently on the orthogonal axis perpendicular to the LED optical axis, and divergence of the light emitted by the optical module on each axes is equal to the square root of the sum of the NIO element divergence square and the light shaping element divergence square on the corresponding axes.

16. The optical module according to claim 15, wherein the light shaping element is a holographic diffuser.

* * * * *